(12) United States Patent
Komanduru V et al.

(10) Patent No.: US 12,334,034 B2
(45) Date of Patent: Jun. 17, 2025

(54) ADAPTIVE SYNCHRONIZATION FOR FLUID DISPLAY REFRESH RATE CHANGES

(71) Applicant: QUALCOMM Incorporated, San Diego, CA (US)

(72) Inventors: Padmanabhan Komanduru V, Hyderabad (IN); Srinivas Pullakavi, Kakinada (IN); Dileep Marchya, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 187 days.

(21) Appl. No.: 18/176,355

(22) Filed: Feb. 28, 2023

(65) Prior Publication Data

US 2024/0290295 A1 Aug. 29, 2024

(51) Int. Cl.
*G09G 5/00* (2006.01)
*G06T 1/20* (2006.01)

(52) U.S. Cl.
CPC .............. *G09G 5/003* (2013.01); *G06T 1/20* (2013.01); *G09G 2320/0266* (2013.01); *G09G 2340/0435* (2013.01)

(58) Field of Classification Search
CPC .................. G09G 5/003; G09G 5/006; G09G 2329/0435; G06T 1/20
USPC .................................................. 345/520, 522
See application file for complete search history.

(56) References Cited

U.S. PATENT DOCUMENTS

| | | | | |
|---|---|---|---|---|
| 2013/0021352 | A1* | 1/2013 | Wyatt | G09G 5/395 345/520 |
| 2014/0092150 | A1* | 4/2014 | Slavenburg | G09G 5/001 345/698 |
| 2017/0053620 | A1* | 2/2017 | Law | G09G 5/395 |
| 2018/0286345 | A1* | 10/2018 | Lee | G09G 5/006 |
| 2021/0358079 | A1* | 11/2021 | Komanduru V | G06T 15/503 |
| 2021/0407456 | A1* | 12/2021 | Hussain | G09G 5/363 |
| 2022/0013087 | A1* | 1/2022 | Marchya | G09G 5/363 |

FOREIGN PATENT DOCUMENTS

| | | |
|---|---|---|
| EP | 3876222 A1 | 9/2021 |
| WO | 2021164004 A1 | 8/2021 |

OTHER PUBLICATIONS

International Search Report and Written Opinion—PCT/US2024/011260—ISA/EPO—Apr. 5, 2024.

* cited by examiner

*Primary Examiner* — Prabodh M Dharia
(74) *Attorney, Agent, or Firm* — Loza & Loza (57) ABSTRACT

Aspects of the disclosure are directed to implementing adaptive variable refresh (AVR) wherein a graphics processing unit (GPU) is configured to generate a display content; a display processing unit (DPU) coupled to the graphics processing unit (GPU), wherein the DPU is configured to provide an adaptive variable refresh (AVR) feature; and a display panel coupled to the DPU, wherein the display panel is configured to display the display content.

30 Claims, 6 Drawing Sheets

ADAPTIVE SYNCHRONIZATION FOR FLUID DISPLAY REFRESH RATE CHANGES

TECHNICAL FIELD

This disclosure relates generally to the field of adaptive synchronization, and, in particular, to adaptive synchronization for fluid display refresh rate changes.

BACKGROUND

A display is an important component in many electronics products. Many user applications require a real-time high-resolution display of dynamic content. One key performance attribute of a display is its display refresh rate. However, in some scenarios or use cases, dynamic variation of the display refresh rate due to display content changes results in undesirable visual artifacts in the display. Thus, there is a continual demand for improved display quality to minimize visual artifacts in a dynamic display content environment.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one aspect, the disclosure provides adaptive synchronization. Accordingly, an apparatus for implementing adaptive variable refresh (AVR), the apparatus including a graphics processing unit (GPU) configured to generate a display content; a display processing unit (DPU) coupled to the graphics processing unit (GPU), the DPU configured to provide an adaptive variable refresh (AVR) feature; and a display panel coupled to the DPU, the display panel configured to display the display content. In one example, the apparatus further includes a databus configured to transport data information and control information between the graphics processing unit (GPU) and the display processing unit (DPU).

In one example, the display content includes a source trigger signal and a vertical synchronization (Vsync) signal. In one example, the vertical synchronization (Vsync) signal triggers a start of a presentation of a sequence of pixels per image frame in the display panel. In one example, the source trigger signal dynamically sets a frame rate or a display refresh rate. In one example, the source trigger signal is adapted to a source content rate of the display content.

In one example, the graphics processing unit (GPU) is configured to derive a trigger control signal from the source trigger signal. In one example, the DPU is configured to select a timing mode of the display content. In one example, the trigger control signal generates a variable vertical synchronization timing periodicity based on the timing mode. In one example, the apparatus further includes a digital signal processor (DSP) to perform signal decompression to the display content.

Another aspect of the disclosure provides a method for implementing adaptive variable refresh (AVR), the method including triggering a start of a presentation of a sequence of pixels per image frame in a display panel; selecting a timing mode based on a display content; providing a trigger control signal to a display processing unit (DPU); and delivering the display content to the display panel with an adaptive frame time based on the timing mode and the trigger control signal.

In one example, the triggering is caused by a vertical synchronization (Vsync) signal. In one example, the display content includes a source content rate. In one example, the display content includes a source trigger signal and the vertical synchronization (Vsync) signal. In one example, the method further includes displaying the display content on the display panel. In one example, the source content rate is not equal to a frame rate of the display panel.

In one example, the method further includes configuring a graphics processing unit (GPU) to generate the display content. In one example, the method further includes using the source trigger signal to set a frame rate or a display refresh rate of the display content. In one example, the method further includes using the trigger control signal to generate a variable vertical synchronization timing periodicity based on the timing mode. In one example, the trigger control signal depends on its relative timing to the variable vertical synchronization timing periodicity.

Another aspect of the disclosure provides an apparatus for implementing adaptive variable refresh (AVR), the apparatus including means for triggering a start of a presentation of a sequence of pixels per image frame in a display panel; means for selecting a timing mode based on a display content; means for providing a trigger control signal to a display processing unit (DPU); and means for delivering the display content to the display panel with an adaptive frame time based on the timing mode and the trigger control signal.

In one example, the means for triggering is configured to use a vertical synchronization (Vsync) signal to trigger the start of the presentation. In one example, the apparatus further includes means for generating the display content. In one example, the display content includes a source content rate, a source trigger signal and the vertical synchronization (Vsync) signal.

In one example, the apparatus further includes means for using the source trigger signal to set a frame rate or a display refresh rate of the display content. In one example, the apparatus further includes means for using the trigger control signal to generate a variable vertical synchronization timing periodicity based on the timing mode. In one example, the trigger control signal depends on its relative timing to the variable vertical synchronization timing periodicity. In one example, the apparatus further includes means for displaying the display content.

Another aspect of the disclosure provides a non-transitory computer-readable medium storing computer executable code, operable on a device including at least one processor and at least one memory coupled to the at least one processor, wherein the at least one processor is configured to implement adaptive variable refresh (AVR), the computer executable code including instructions for causing a computer to trigger a start of a presentation of a sequence of pixels per image frame in a display panel; instructions for causing the computer to select a timing mode based on a display content; instructions for causing the computer to provide a trigger control signal to a display processing unit (DPU); and instructions for causing the computer to deliver the display content to the display panel with an adaptive frame time based on the timing mode and the trigger control signal.

In one example, the display content includes a source content rate, a source trigger signal and a vertical synchronization (Vsync) signal and the non-transitory computer-readable medium further includes instructions for causing the computer to use the source trigger signal to set a frame rate or a display refresh rate of the display content and to use the vertical synchronization (Vsync) signal to trigger the start of the presentation.

These and other aspects of the present disclosure will become more fully understood upon a review of the detailed description, which follows. Other aspects, features, and implementations of the present disclosure will become apparent to those of ordinary skill in the art, upon reviewing the following description of specific, exemplary implementations of the present invention in conjunction with the accompanying figures. While features of the present invention may be discussed relative to certain implementations and figures below, all implementations of the present invention can include one or more of the advantageous features discussed herein. In other words, while one or more implementations may be discussed as having certain advantageous features, one or more of such features may also be used in accordance with the various implementations of the invention discussed herein. In similar fashion, while exemplary implementations may be discussed below as device, system, or method implementations it should be understood that such exemplary implementations can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

In one aspect, a display is commonly used to render a display signal onto a two-dimensional surface as a function of time. For example, the display may be characterized in terms of spatial resolution and temporal resolution. That is, the display signal may carry information in a spatial domain having spatial dimensions and a time domain having a temporal dimension simultaneously. In one example, the spatial domain ranges over a spatial extent (i.e., maximum spatial dimensions). In one example, the time domain ranges over a temporal extent (i.e., maximum time duration). In one example, a "display" is a "display panel".

In one example, spatial resolution relates to an ability of distinguishing spatially adjacent objects more precisely in the spatial dimensions. In one example, temporal resolution relates to an ability of distinguishing temporally sequential objects more precisely in the temporal dimension. In one example, higher spatial resolution and/or higher temporal resolution requires more information content (e.g., higher quantity of information bits or higher information entropy) over a given spatial extent and a given temporal extent.

In one example, the display signal conveys a temporal sequence of image frames with both high spatial resolution (e.g., high-definition video) and high temporal resolution (i.e., rapid frame rate), In one example, the display signal may be defined as a temporal sequence of image frames where each image frame is a plurality of pixels (i.e., picture elements). For example, each pixel of the plurality of pixels may include a plurality of color components (e.g., red, green, blue or RGB). For example, each color component of the plurality of color components for each pixel may have an intensity or amplitude value associated with it (e.g., brightness, luminance, etc.). For example, each color component for each pixel may have an intensity or amplitude value represented by bits. That is, in one example, the display signal may be a video signal. For example, the video signal is a display signal which conveys a temporal sequence of image frames which evolve as a function of time. For example, the display content may be a video content.

In one example, spatial resolution of the display relates to image quality in two spatial dimensions, horizontal and vertical. For example, higher spatial resolution requires more pixels or samples per spatial extent in the image frames. In one example, spatial resolution is determined by the quantity of pixels in the image frame. In one example, the image frame includes a plurality of rows and a plurality of columns. For example, the quantity of pixels per image frame may be described by a product of horizontal pixels per row (i.e., in the horizontal direction) and rows per column or vertical pixels per column (i.e., in the vertical direction).

In one example, the ratio of horizontal pixels to vertical pixels in the image frame is denoted as aspect ratio. For example, an aspect ratio of 16:9 means that there are 16 horizontal pixels for every 9 vertical pixels. In one example, a high-definition video display of 1920 horizontal pixels by 1080 vertical pixels results in a 16:9 aspect ratio. In another example, a high-definition video display of 3840 horizontal pixels by 2160 vertical pixels also results in a 16:9 aspect ratio.

In one example, temporal resolution of the display relates to image quality in the temporal dimension. For example, higher temporal resolution requires more image frames per temporal extent. In one example, temporal resolution is determined by a frame rate; that is, the quantity of image frames per second (fps). In one example, the frame rate may be expressed in Hertz (Hz) which is equivalent to frames per second. For example, the frame rate is typically a multiple of 30 frames per second (i.e., 30 Hz). For example, the frame rate may be 30 fps, 60 fps, 120 fps, 240 fps, etc.

Alternatively, in one example, the temporal resolution is determined by a frame period; that is, a reciprocal of the frame rate. For example, a 30 fps frame rate results in a frame period of 33.33 ms, a 60 fps frame rate results in a frame period of 16.67 ms, a 120 fps frame rate results in a frame period of 8.33 ms, a frame rate of 240 fps results in a frame period of 4.17 ms, etc.

In one example, a reference display signal with a reference spatial resolution, a reference temporal resolution and a reference pixel rate may be used as a comparative quality benchmark for other display signals. For example, the reference display signal may be a standard resolution display signal with 640 horizontal pixels by 480 vertical pixels and a 30 fps frame rate with a reference pixel rate of 9.2 Megapixels per second.

In one example, a display signal with higher spatial resolution and higher temporal resolution than the reference display signal results in a higher pixel rate than the reference pixel rate. For example, a pixel rate (i.e., quantity of pixels per second) may be determined by a product of the quantity of pixels per image frame and the frame rate. That is, for example, the pixel rate is given by the product of horizontal pixels per row times vertical pixels per column times frames per second.

In one example, a high-definition video display of 1920 horizontal pixels by 1080 vertical pixels with a 60 fps frame rate results in a pixel rate of 124.4 Megapixels per second. For example, if each color component has intensity or amplitude value represented by 8 bits and if each pixel has 3 color components, then each pixel may be represented by 24 bits and the aggregate video bit rate in this example may be nearly 3000 Mbit/see (i.e., 3 Gbit/see).

In one example, a display may be presented by a conversion of display content (i.e., having two spatial dimensions and one temporal dimension) from the display source into a raster signal as a function of time (i.e., single dimensional signal in the temporal dimension). For example, the raster signal may present a first image frame during a first frame period by executing an image scan which presents a sequence of horizontal pixels per row starting with a first row (e.g., a top row), continuing in succession among subsequent rows and ending with a last row (e.g., a bottom row). Next, the raster signal may present a subsequent image frame during a subsequent frame period in a similar manner.

In one example, the display content may be characterized by a source content rate; that is, how rapidly the display content changes over time. For example, the source content rate may be variable (e.g., due to dynamic display content). For example, the source content rate may not be equal to the frame rate (e.g., due to a static or slowly varying display content).

In one example, proper presentation of the display requires a plurality of synchronization signals. For example, synchronization signals are timing references which coordinate and temporally harmonize various display events. In one example, a horizontal synchronization (Hsync) signal may be used to trigger a start of a presentation of a sequence of horizontal pixels per row. In one example, a vertical synchronization (Vsync) signal may be used to trigger a start of a presentation of a sequence of horizontal and vertical pixels per image frame.

In one example, the Vsync signal synchronizes the display with the display source, e.g., a graphics processing unit (GPU). For example, the Vsync signal may synchronize the display refresh rate of the display to prevent discontinuities in the display.

In one example, the Vsync signal is a timing reference which synchronizes the display with a display source, e.g., a graphics processing unit (GPU). In one example, the display source delivers a plurality of image frames to a destination, e.g., a display. For example, the Vsync signal may be a plurality of Vsync signal pulses with a pulse repetition frequency (PRF) equal to the frame rate. In one example, the display source includes a display source output rate which specifies a number of output image frames per second from the display source. In one example, the Vsync signal triggers a display of each image frame which the GPU renders. In one example, the display has a display refresh rate; that is, a maximum number of frames per second (fps) which can be displayed. For example, a display with a 60 Hz frame rate may display up to 60 fps, and a display with a 120 Hz frame rate may display up to 120 fps. In one example, the Vsync signal synchronizes the display refresh rate and frame rate of a mobile device display or monitor to prevent screen tearing (i.e., a discontinuous image display). In one example, the Vsync signal limits the display source output frame rate (e.g., GPU output frame rate) to the display refresh rate. For example, a display processing unit (DPU) generates a Vsync signal pulse every 16.67 ms for a display with 60 Hz frame rate.

In one example, a display may support a wide range of display refresh rates, for example, 1 fps. In one example, to minimize dc power consumption, a display processing unit (DPU) may estimate the source content rate and adjust the display refresh rate close to the source content rate while maintaining cadence. For example, there may be numerous display refresh rate changes on the display. In one example, the display refresh rate may be as high as 120 fps. For example, the source content rate may be 30 fps and the display refresh rate may be adjusted to 60 fps. Subsequently, for example, if there is some dynamic activity in the display, the display refresh rate may switch to 120 fps.

In one example, an adaptive variable refresh (AVR) feature, also known as adaptive synchronization technology or as Qsync feature, may modify a current frame timeline by extending a vertical timing duration and adapting to a source trigger event. In one example, the source trigger event refers to an event where the display source is ready to deliver one image frame of the plurality of image frames to the destination. In one example, the source trigger event sets the frame period or display refresh rate dynamically and is adapted to the source content rate.

In one example, the AVR feature (a.k.a. Qsync feature) may include two distinct timing modes, a first timing mode which defines a normal frame timing and a second timing mode which defines a slower frame timing. In one example, the AVR feature may include a trigger control signal in a processor (e.g., DPU) which varies a Vsync signal timing periodicity between a normal frame time period and a slow frame time period. For example, the trigger control signal may depend on its relative timing to the Vsync signal. In one example, if the trigger control signal is activated prior to an end of the normal frame time period, the current frame will terminate at the end of the normal frame time period.

In one example, if the trigger control signal is not activated within the normal frame time period, a timing engine extends the duration of the Vsync pulse repetition frequency to generate an extended frame until the extended frame is equal to a maximum frame threshold associated with the slow frame time period. In one example, if the trigger control signal is activated prior to the end of the slow frame time period, the current frame transitions to an intermediate frame which has a frame time period between the normal frame time period and the slow frame time period. In one example, the timing engine is part of the DPU.

In one example, the AVR feature may have two scenarios for display refresh rate changes: a first scenario with a transition from high to low display refresh rate and a second scenario with a transition from low to high display refresh rate. For example, in the first scenario, the DPU may enable the AVR feature to change the display refresh rate to a lower value. In one example, the trigger control pulse is not enabled on subsequent frames. In one example, the transition in display refresh rate in the first scenario is instantaneous and frames are delivered by the DPU at expected Vsync signal pulse boundaries to emulate true display refresh rate behavior.

For example, in the second scenario, the DPU may calculate a timing margin needed to switch the display refresh rate to a higher value with zero cadence deviation. In one example, the trigger control pulse is enabled (i.e., timing is adjusted) based on the calculated timing margin for the transition to higher display refresh rate. For example, the DPU may disable the AVR feature after the display refresh rate is adjusted. In one example, the transition in display refresh rate in the second scenario ensures a rapid transition to a higher display refresh rate to minimize janks and improve response time.

In one example, a design goal for the display is rendering as a fluid sequence of image frames. That is, the display should be presented with no or minimal jank, or interruptions, to avoid a visually discontinuous sequence of image frames. For example, the AVR feature results in a fluid display refresh rate dynamical behavior for the display. In one example, an active state is an active region in the display timing sequence where actual pixel content is transmitted from the DPU to the display panel. In one example, an inactive state is a blanking region in the display timing sequence where no pixel content is transmitted from the DPU to the display panel.

Figure 1A:
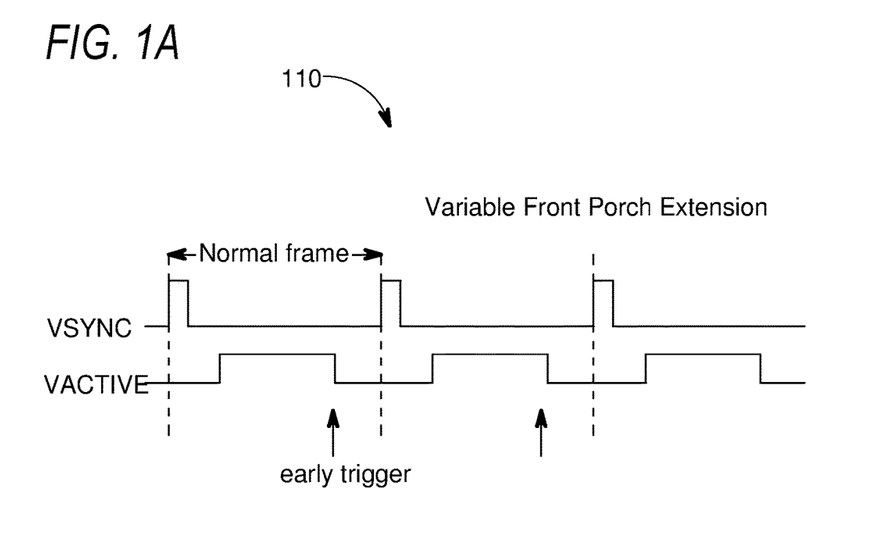
FIGS. 1A, 1B and 1C illustrate three respective example adaptive variable refresh (AVR) trigger scenarios for the AVR feature.
Figure 1B:
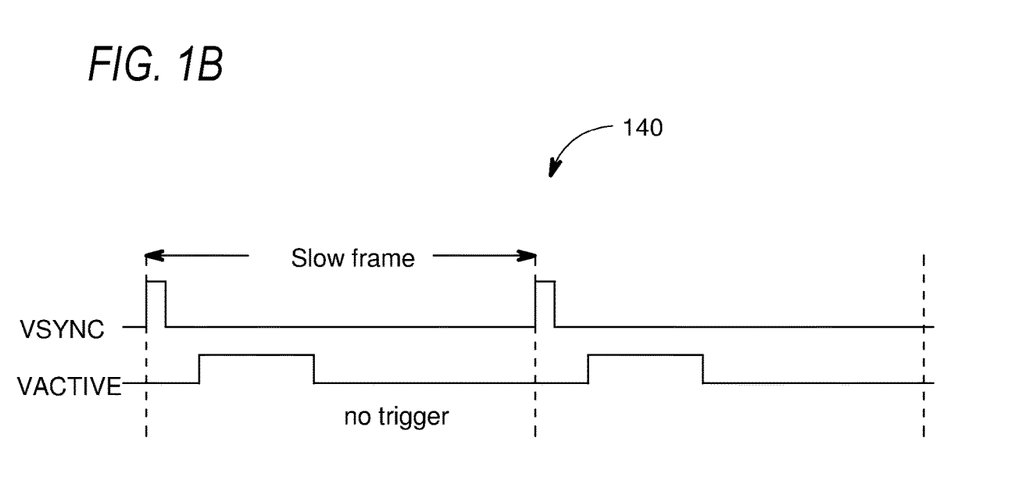
Figure 1C:
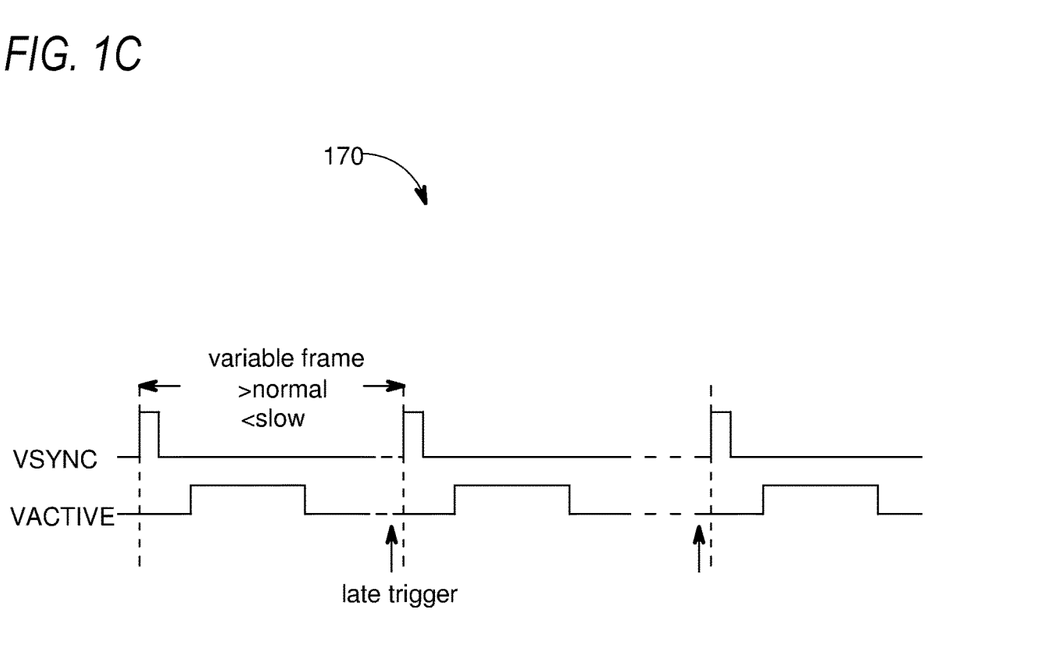

FIGS. 1a, 1b and 1c illustrate three respective example adaptive variable refresh (AVR) trigger scenarios for the AVR feature. For example, FIG. 1a illustrates an early trigger scenario 110 where the Vsync signal (upper trace) has a PRF equal to a normal frame rate. In one example, a trigger control signal (lower trace, Vactive) transitions from a high state to a low state (e.g., from active state to inactive state) prior to a successive Vsync pulse. In one example, in the early trigger scenario 110, an early trigger event occurs. That is, the early trigger scenario 110 includes a trigger control signal which occurs during an active state. In one example, the display refresh rate has a period equal to the normal frame time period.

For example, FIG. 1b illustrates a no trigger scenario 140 where the Vsync signal (upper trace) has a PRF equal to a slow frame rate. In one example, the trigger control signal (lower trace, Vactive) transitions from a high state to a low state (e.g., from active state to inactive state) subsequent to a successive Vsync pulse. In one example, in the no trigger scenario 140, no trigger event occurs. In one example, the display refresh rate has a period equal to the slow frame time period.

For example, FIG. 1c illustrates a late trigger scenario 170 where the Vsync signal (upper trace) has a PRF equal to a variable frame rate which is slower than the normal frame rate and faster than the slow frame rate. In one example, the trigger control signal (lower trace, Vactive) transitions from a high state to a low state (e.g., from active state to inactive state) subsequent to a successive Vsync pulse. In one example, in the late trigger scenario 170, a late trigger event occurs. That is, the late trigger scenario 170 includes a trigger control signal which occurs during an inactive state. In one example, the display refresh rate has a period between the normal frame time period and the slow frame time period.

In one example, a display processing unit (DPU) supports two modes of the AVR feature, a continuous mode and a one-shot mode. For example, the continuous mode may be a default mode for the AVR feature. For example, once the Qsync mode is enabled, the DPU may assume a slow frame for the current image frame and all subsequent image frames until the AVR feature is disabled, for example, by software. In one example, the frame period may be dynamically modified to a normal frame period or a slow frame period dependent on when the software programs the trigger event.

In one example, the one-shot mode may enable a frame extension for only the current image frame. In one example, subsequent image frames are not extended and the software does not need to explicitly disable the AVR feature. In one example, the software needs to re-enable the AVR feature for a future image frame which may need a frame extension.

Figure 2:
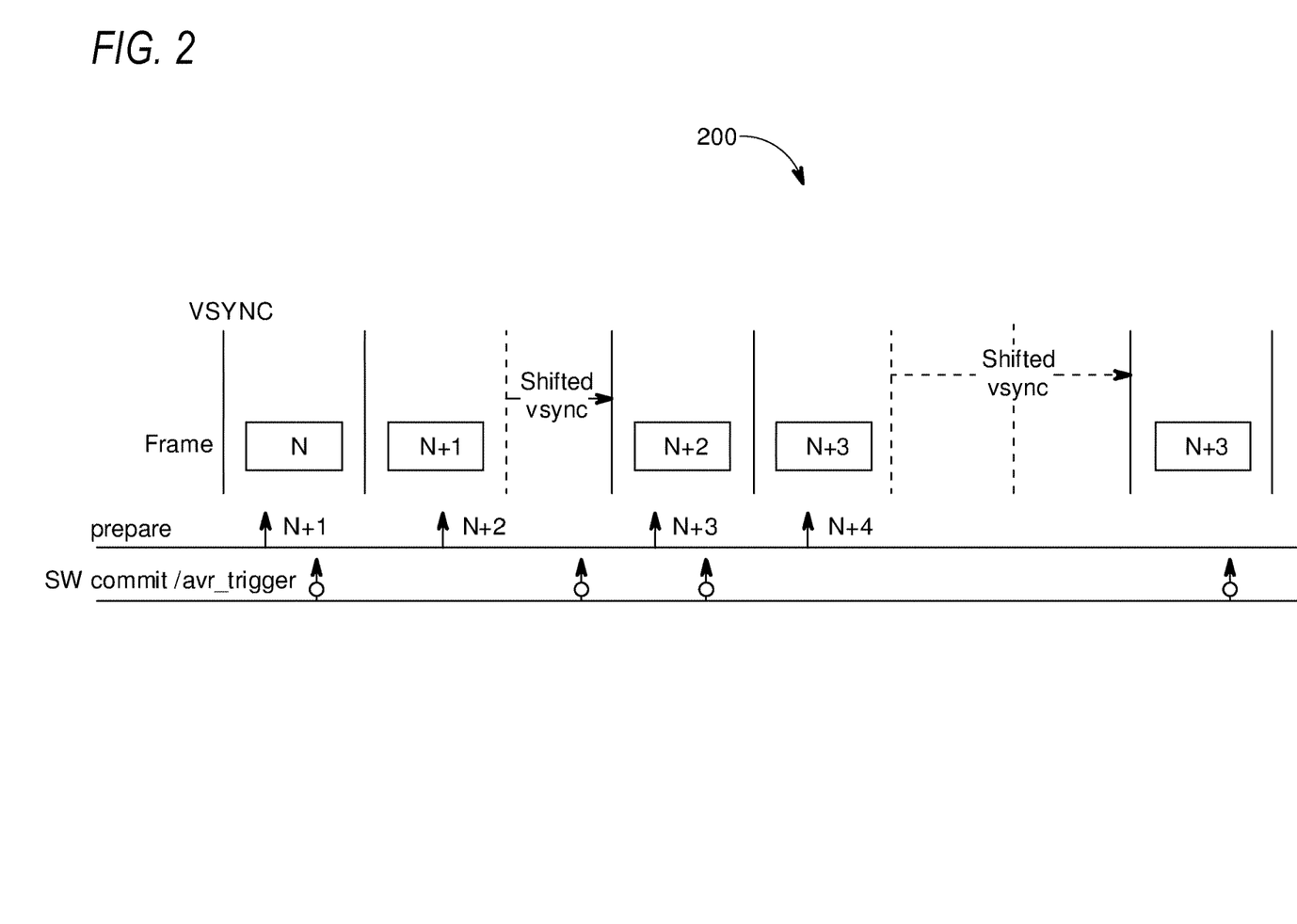
FIG. 2 illustrates an example continuous mode for adaptive variable refresh (AVR).

FIG. 2 illustrates an example continuous mode 200 for adaptive variable refresh (AVR). In one example, the top portion of FIG. 2 shows vertical lines representing occurrences of the Vsync signal and labeled rectangles representing image frames. In one example, the bottom portion of FIG. 2 shows a prepare signal pulse sequence which initializes a subsequent image frame and a trigger control signal pulse sequence which controls frame time period.

For example, for a first image frame time period, a first pulse of the trigger control signal pulse sequence is received prior to end of the normal frame time period, so the first image frame time period ends with the normal frame time period. For example, for a second image frame time period, a second pulse of the trigger control signal pulse sequence is received subsequent to the end of the normal frame time period but prior to the end of the slow frame time period, so a subsequent image frame commences after the second pulse is received. For example, for a third image frame time period, a third pulse of the trigger control signal pulse sequence is received prior to end of the normal frame time period, so the third image frame time period ends with the normal frame time period. For example, for a fourth image frame time period, a pulse of the trigger control signal pulse sequence is not received, so the fourth image frame time period ends with the slow frame time period. For example, for a fifth image frame time period, a fourth pulse of the trigger control signal pulse sequence is received prior to end of the normal frame time period, so the fifth image frame time period ends with the normal frame time period.

Figure 3:
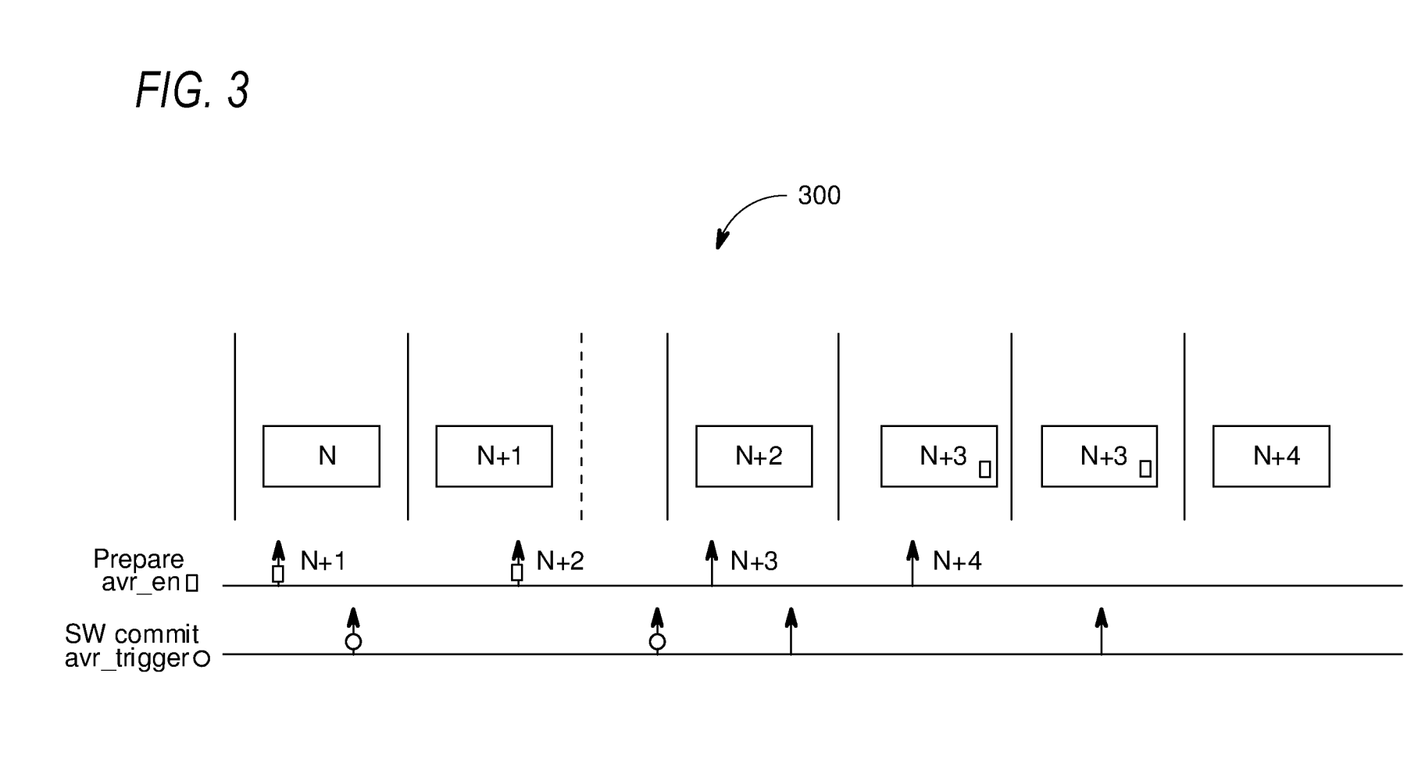
FIG. 3 illustrates an example one-shot mode for adaptive variable refresh (AVR).

FIG. 3 illustrates an example one-shot mode 300 for adaptive variable refresh (AVR). In one example, the top portion of FIG. 3 shows vertical lines representing occurrences of the Vsync signal and labeled rectangles representing image frames. In one example, the bottom portion of FIG. 3 shows a prepare signal pulse sequence which initializes a subsequent image frame and a trigger control signal pulse sequence which controls frame time period.

In one example, for a first image frame time period, a first pulse of the trigger control signal pulse sequence is received prior to the end of the normal frame time period, so the first image frame time period ends with the normal frame time period. In one example, for a second image frame time period, a second pulse of the trigger control signal pulse sequence is received subsequent to the end of the normal frame time period but prior to the end of the slow frame time period, so a subsequent image frame commences after the second pulse is received. In one example, after the second image frame time period, subsequent image frame time periods are not affected. For example, software may not need to disable the AVR feature explicitly. For example, the software may re-enable the AVR feature for a future image frame which may need an extension in its image frame time period.

Figure 4:
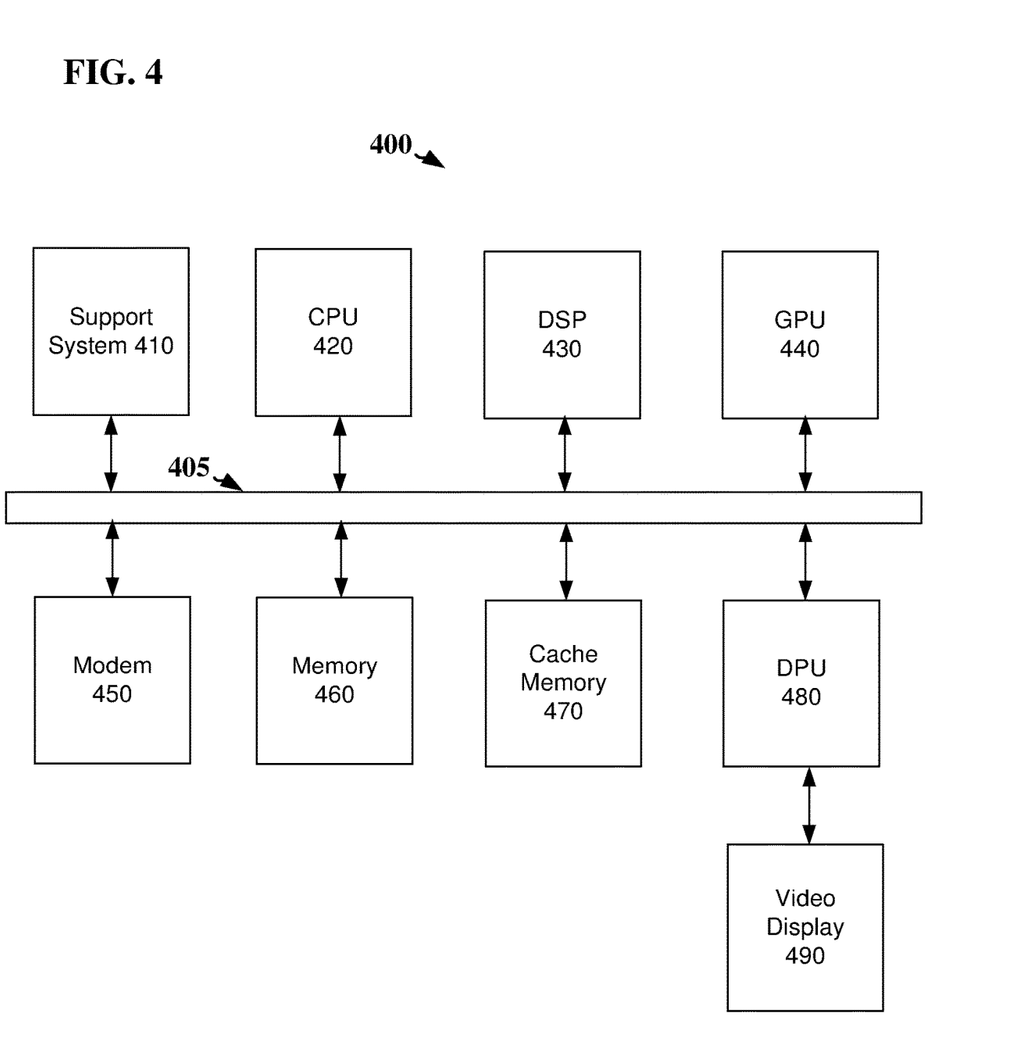
FIG. 4 illustrates an example information processing system with display.

FIG. 4 illustrates an example information processing system 400 with display. In one example, the information processing system 400 includes a plurality of processing engines such as a central processing unit (CPU) 420, a digital signal processor (DSP) 430, a graphics processing unit (GPU) 440, a display processing unit (DPU) 480, etc. In one example, various other functions in the information processing system 400 may be included such as a support system 410, a modem 450, a memory 460, a cache memory 470 and a display 490. For example, the plurality of processing engines and various other functions may be interconnected by a databus 405 to transport data and control information.

In one example, the support system 410 provides auxiliary functions such as frequency references, timing references, memory management, software management, network management, etc. For example, the CPU 420 may provide central management and control of the information processing system 400. In one example, the CPU 420 is a microprocessor. In one example, the DSP 430 provides specialized signal processing functions such as signal compression and signal decompression, audio compression and audio decompression, forward error detection and correction, frame recovery, timing recovery, frequency recovery, etc. In one example, the GPU 440 provides graphical signal processing, e.g., image formatting and rendering. For example, the GPU 440 may provide the display content in the information processing system 400. For example, the GPU 440 generates the display content with a source content rate.

In one example, the modem 450 provides a communication interface to external parties. For example, the modem 450 may provide a wireless or wireline access to external networks and users via, for example, the Internet. In one example, the memory 460 provides a storage medium for instructions and data for the information processing system 400. In one example, the cache memory 470 provides a local and rapid access storage medium for the information processing system 400. In one example, the DPU 480 provides management and control of the display 490. For example, the DPU 480 may provide the adaptive variable refresh (AVR) feature for the display 490. For example, the DPU 480 may provide a Vsync signal to trigger a start of a presentation of a sequence of horizontal and vertical pixels per image frame. In one example, the DPU 480 uses the Vsync signal to synchronize the display 490. In one example, the display 490 has a display refresh rate.

In one example, the graphics processing unit (GPU) 440 serves as a source for display content with a source content rate to the DPU 480. For example, the DPU 480 may provide a vertical synchronization (Vsync) signal to trigger a start of a presentation of a sequence of horizontal and vertical pixels per image frame. For example, the DPU 480 may use the Vsync signal to synchronize the display 490.

In one example, the display 490 has a display refresh rate; that is, a maximum number of frames per second (fps) which may be displayed. In one example, the GPU 440 provides a source trigger signal when the source for display content is ready to deliver one image frame of the plurality of image frames to the destination. In one example, the source trigger signal sets the frame period or display refresh rate dynamically and is adapted to the source output rate.

In one example, an adaptive variable refresh (AVR) feature, also known as adaptive synchronization technology or as AVR feature or a Qsync feature, may modify a current frame timeline by extending a vertical timing duration and adapting to a source trigger event. In one example, the source trigger event refers to an event where the display source is ready to deliver one image frame of the plurality of image frames to the destination. In one example, the source trigger event sets the frame period or display refresh rate dynamically and is adapted to the display source output rate.

In one example, the AVR feature (a.k.a. Qsync feature) may include two timing modes, a first timing mode which defines a normal frame timing and a second timing mode which defines a slower frame timing. In one example, the AVR feature also may include a trigger control signal in a processor (e.g., DPU) which produces a variable Vsync signal timing periodicity between a normal frame time period and a slow frame time period. In one example, the trigger control signal depends on its relative timing to the Vsync signal.

Figure 5:
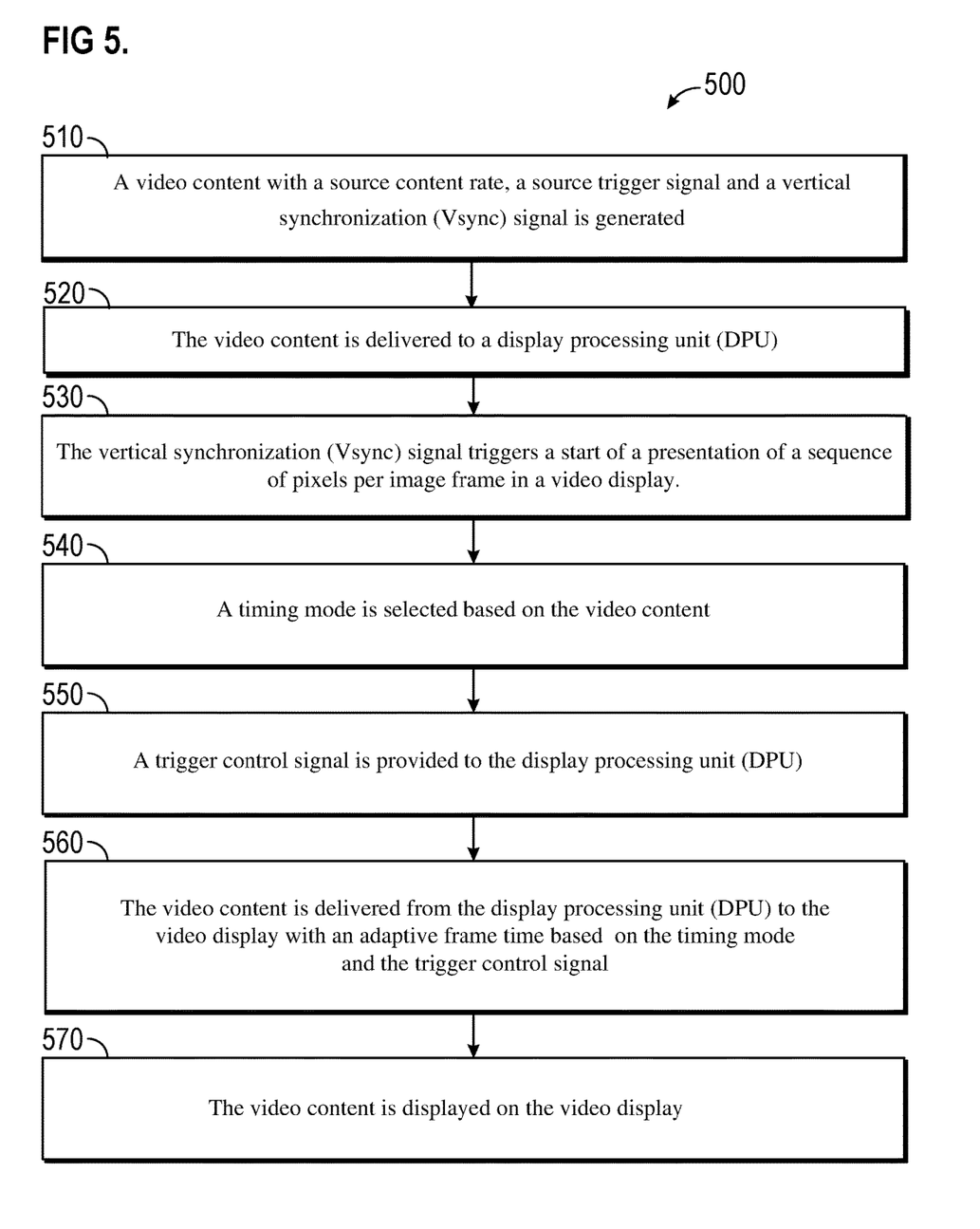
FIG. 5 illustrates an example flow diagram for adaptive variable refresh (AVR) for a display.

FIG. 5 illustrates an example flow diagram 500 for adaptive variable refresh (AVR) for a display. In block 510, a display content with a source content rate, a source trigger signal and a vertical synchronization (Vsync) signal is generated. In one example, the display content is generated by a graphics processing unit (GPU). In one example, the source content rate is not equal to a frame rate of a display.

In block 520, the display content is delivered to a display processing unit (DPU). In one example, the source trigger signal sets the frame rate or display refresh rate dynamically and is adapted to the source content rate.

In block 530, the vertical synchronization (Vsync) signal triggers a start of a presentation of a sequence of pixels per image frame in a display. In one example, the sequence of pixels includes horizontal pixels and vertical pixels. In one example, the Vsync signal is provided by the DPU to the display.

In block 540, a timing mode is selected based on the display content. For example, the timing mode may be a first timing mode or a second timing mode. In one example, the first timing mode provides a normal frame timing signal and the second timing mode provides a slower frame timing signal. In one example, the timing mode is selected by the DPU.

In block 550, a trigger control signal is provided to the display processing unit (DPU). In one example, the trigger control signal generates a variable vertical synchronization timing periodicity based on the timing mode. In one example, the timing mode selects between a normal frame time period and a slow frame time period. In one example, the trigger control signal depends on its relative timing to the variable vertical synchronization timing periodicity. In one example, the normal frame timing signal and the slow frame timing signal are provided by the DPU. In one example, the trigger control signal is derived from the source trigger signal. In one example, the GPU is configured to derive the trigger control signal from the source trigger signal.

In block 560, the display content is delivered from the DPU to the display with an adaptive frame time based on the timing mode and the trigger control signal. In one example, the timing mode is the first timing mode or the second timing mode. In one example, the display content is delivered by the DPU.

In block 570, the display content is displayed on the display.

In one aspect, one or more of the steps in FIG. 5 may be executed by one or more processors which may include hardware, software, firmware, etc. In one aspect, one or more of the steps in FIG. 5 may be executed by one or more processors which may include hardware, software, firmware, etc. The one or more processors, for example, may be used to execute software or firmware needed to perform the steps in the flow diagram of FIG. 5. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may reside in a processing system, external to the processing system, or distributed across multiple entities including the processing system. The computer-readable medium may be embodied in a computer program product. By way of example, a computer program product may include a computer-readable medium in packaging materials. The computer-readable medium may include software or firmware. Those skilled in the art will recognize how best to implement the described functionality presented throughout this disclosure depending on the particular application and the overall design constraints imposed on the overall system.

Any circuitry included in the processor(s) is merely provided as an example, and other means for carrying out the described functions may be included within various aspects of the present disclosure, including but not limited to the instructions stored in the computer-readable medium, or any other suitable apparatus or means described herein, and utilizing, for example, the processes and/or algorithms described herein in relation to the example flow diagram.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in the figures may be rearranged and/or combined into a single component, step, feature or function or embodied in several components, steps, or functions. Additional elements, components, steps, and/or functions may also be added without departing from novel features disclosed herein. The apparatus, devices, and/or components illustrated in the figures may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

One skilled in the art would understand that various features of different embodiments may be combined or modified and still be within the spirit and scope of the present disclosure.

What is claimed is:

1. An apparatus for implementing adaptive variable refresh (AVR), the apparatus comprising:
    a graphics processing unit (GPU) configured to generate a display content;
    a display processing unit (DPU) coupled to the graphics processing unit (GPU), the DPU configured to provide an adaptive variable refresh (AVR) feature and further configured to use the AVR feature to enable a transition to a higher display refresh rate based on a calculated timing margin with a zero cadence deviation; and a display panel coupled to the DPU, the display panel configured to display the display content.

2. The apparatus of claim 1, further comprising a databus configured to transport data information and control information between the graphics processing unit (GPU) and the display processing unit (DPU).

3. The apparatus of claim 1, wherein the display content includes a source trigger signal and a vertical synchronization (Vsync) signal.

4. The apparatus of claim 3, wherein the vertical synchronization (Vsync) signal triggers a start of a presentation of a sequence of pixels per image frame in the display panel.

5. The apparatus of claim 3, wherein the source trigger signal dynamically sets a frame rate or a display refresh rate; wherein the display refresh rate is set based on the timing mode.

6. The apparatus of claim 5, wherein the source trigger signal is adapted to a source content rate of the display content.

7. The apparatus of claim 6, wherein the graphics processing unit (GPU) is configured to derive a trigger control signal from the source trigger signal.

8. The apparatus of claim 7, wherein the DPU is configured to select a timing mode of the display content.

9. The apparatus of claim 8, wherein the trigger control signal generates a variable vertical synchronization timing periodicity based on the timing mode; wherein the variable vertical synchronization timing periodicity is between a normal frame time period and a slow frame time period.

10. The apparatus of claim 1 further comprising a digital signal processor (DSP) to perform signal decompression to the display content.

11. A method for implementing adaptive variable refresh (AVR), the method comprising:

triggering a start of a presentation of a sequence of pixels per image frame in a display panel;

selecting a timing mode based on a display content;

providing a trigger control signal to a display processing unit (DPU);

using an adaptive variable refresh (AVR) feature to enable a transition to a higher display refresh rate based on a calculated timing margin with a zero cadence deviation; and delivering the display content to the display panel with an adaptive frame time based on the timing mode and the trigger control signal.

12. The method of claim 11, wherein the triggering is caused by a vertical synchronization (Vsync) signal.

13. The method of claim 12, wherein the display content includes a source content rate.

14. The method of claim 13, wherein the display content includes a source trigger signal and the vertical synchronization (Vsync) signal.

15. The method of claim 14, further comprising displaying the display content on the display panel.

16. The method of claim 15, wherein the source content rate is not equal to a frame rate of the display panel.

17. The method of claim 14, further comprising configuring a graphics processing unit (GPU) to generate the display content.

18. The method of claim 14, further comprising using the source trigger signal to set a frame rate or a display refresh rate of the display content; wherein the display refresh rate is set based on the timing mode.

19. The method of claim 11, further comprising using the trigger control signal to generate a variable vertical synchronization timing periodicity based on the timing mode; wherein the variable vertical synchronization timing periodicity is between a normal frame time period and a slow frame time period.

20. The method of claim 19, wherein the trigger control signal depends on its relative timing to the variable vertical synchronization timing periodicity.

21. An apparatus for implementing adaptive variable refresh (AVR), the apparatus comprising:

means for triggering a start of a presentation of a sequence of pixels per image frame in a display panel;

means for selecting a timing mode based on a display content;

means for providing a trigger control signal to a display processing unit (DPU);

means for using an adaptive variable refresh (AVR) feature to enable a transition to a higher display refresh rate based on a calculated timing margin with a zero cadence deviation; and means for delivering the display content to the display panel with an adaptive frame time based on the timing mode and the trigger control signal.

22. The apparatus of claim 21, wherein the means for triggering is configured to use a vertical synchronization (Vsync) signal to trigger the start of the presentation.

23. The apparatus of claim 22, further comprising means for generating the display content.

24. The apparatus of claim 23, wherein the display content includes a source content rate, a source trigger signal and the vertical synchronization (Vsync) signal.

25. The apparatus of claim 24, further comprising means for using the source trigger signal to set a frame rate or a display refresh rate of the display content; wherein the display refresh rate is set based on the timing mode.

26. The apparatus of claim 21, further comprising means for using the trigger control signal to generate a variable vertical synchronization timing periodicity based on the timing mode, wherein the variable vertical synchronization timing periodicity is between a normal frame time period and a slow frame time period.

27. The apparatus of claim 26, wherein the trigger control signal depends on its relative timing to the variable vertical synchronization timing periodicity.

28. The apparatus of claim 21, further comprising means for displaying the display content.

29. A non-transitory computer-readable medium storing computer executable code, operable on a device comprising at least one processor and at least one memory coupled to the at least one processor, wherein the at least one processor is configured to implement adaptive variable refresh (AVR), the computer executable code comprising:

instructions for causing a computer to trigger a start of a presentation of a sequence of pixels per image frame in a display panel;

instructions for causing the computer to select a timing mode based on a display content;

instructions for causing the computer to provide a trigger control signal to a display processing unit (DPU);

instructions for causing the computer to use an adaptive variable refresh (AVR) feature to enable a transition to a higher display refresh rate based on a calculated timing margin with a zero cadence deviation; and instructions for causing the computer to deliver the display content to the display panel with an adaptive frame time based on the timing mode and the trigger control signal.

30. The non-transitory computer-readable medium of claim 29, wherein the display content includes a source content rate, a source trigger signal and a vertical synchronization (Vsync) signal and the non-transitory computer-readable medium further comprises instructions for causing the computer to use the source trigger signal to set a frame rate or a display refresh rate of the display content and to use the vertical synchronization (Vsync) signal to trigger the start of the presentation; wherein the display refresh rate is set based on the timing mode.

* * * * *